United States Patent
Wang et al.

(10) Patent No.: US 11,919,113 B2
(45) Date of Patent: Mar. 5, 2024

(54) METHOD FOR DIAGNOSING HEALTH OF CNC MACHINE TOOL

(71) Applicants: CHANGZHOU ELECTROMECHANICAL VOCATIONAL AND TECHNICAL COLLEGE, Jiangsu (CN); JIANGSU DABEI SMART TECHNOLOGY CO., LTD, Jiangsu (CN)

(72) Inventors: Yunliang Wang, Jiangsu (CN); Jing Lou, Jiangsu (CN); Yuehui Zhuang, Jiangsu (CN); Zhicheng Wang, Jiangsu (CN)

(73) Assignees: CHANGZHOU ELECTROMECHANICAL VOCATIONAL AND TECHNICAL COLLEGE, Jiangsu (CN); JIANGSU DABEI SMART TECHNOLOGY CO., LTD, Jiangsu (CN)

( * ) Notice: Subject to any disclaimer, the term of this patent is extended or adjusted under 35 U.S.C. 154(b) by 473 days.

(21) Appl. No.: 17/424,091

(22) PCT Filed: Dec. 14, 2020

(86) PCT No.: PCT/CN2020/136109
§ 371 (c)(1),
(2) Date: Jul. 19, 2021

(87) PCT Pub. No.: WO2021/121182
PCT Pub. Date: Jun. 24, 2021

(65) Prior Publication Data
US 2022/0097193 A1     Mar. 31, 2022

(30) Foreign Application Priority Data
Dec. 18, 2019  (CN) .......................... 201911312259.9

(51) Int. Cl.
*B23Q 17/09*     (2006.01)
*B23Q 17/12*     (2006.01)
(Continued)

(52) U.S. Cl.
CPC ..... *B23Q 17/0995* (2013.01); *B23Q 17/0985* (2013.01); *B23Q 17/12* (2013.01);
(Continued)

(58) Field of Classification Search
CPC ........ B23Q 17/008; B23Q 17/12; G06F 17/16
See application file for complete search history.

(56) References Cited

U.S. PATENT DOCUMENTS

| 2007/0093976 A1 | 4/2007 | Nishizawa |
| 2018/0178293 A1* | 6/2018 | Yamamoto ............... B23G 5/00 |
| 2020/0232880 A1* | 7/2020 | Barrau ................... F16H 57/01 |

FOREIGN PATENT DOCUMENTS

| CN | 102520697 A | 6/2012 |
| CN | 110471366 A | 11/2019 |

(Continued)

OTHER PUBLICATIONS

Office Action and Search Report (with English translation) of the corresponding to Chinese application No. 201911312259.9 dated May 27, 2020. (pp. 8).

(Continued)

*Primary Examiner* — Son T Le
*Assistant Examiner* — Brian Butler Geiss
(74) *Attorney, Agent, or Firm* — MUNCY, GEISSLER, OLDS & LOWE, P.C.

(57) ABSTRACT

The present invention belongs to the field of automation equipment predictive maintenance, and relates to a method for diagnosing health of a CNC machine tool. Parameters such as vibration and temperature are detected by Zigbee nodes adopted in the present invention and uploaded to a (Continued)

Zigbee gateway. The detected data is transmitted by the Zigbee gateway to a cloud server for digital signal processing, data mining and analysis processing. After a training test of the above data is carried out by the cloud server, a health degree model is obtained. The health degree model is transmitted by the cloud server to the Zigbee gateway. A clock circuit can be used for synchronizing system time and recording time as data is recorded. For the on-line predictive maintenance of a CNC machine tool, the most rapid and accurate predictive maintenance information is provided.

7 Claims, 1 Drawing Sheet

(51) Int. Cl.
*G06F 17/14* (2006.01)
*G06F 17/16* (2006.01)

(52) U.S. Cl.
CPC ............ *G06F 17/142* (2013.01); *G06F 17/16* (2013.01); *B23Q 2717/00* (2013.01)

(56) References Cited

FOREIGN PATENT DOCUMENTS

| | | |
|---|---|---|
| CN | 110570052 A | 12/2019 |
| CN | 110977614 A | 4/2020 |
| TW | 200516468 A | 5/2005 |

OTHER PUBLICATIONS

Notification of Grant (with English translation) corresponding to Chinese application No. 201911312259.9 dated Jun. 30, 2020. (pp. 5).

* cited by examiner

METHOD FOR DIAGNOSING HEALTH OF CNC MACHINE TOOL

TECHNICAL FIELD

The present invention belongs to the field of automation equipment predictive maintenance, and relates to a method for diagnosing health of a CNC machine tool.

BACKGROUND

Performance and reliability of a CNC machine tool are of vital importance, which determine the service life and working efficiency of the CNC machine tool. At present, the maintenance of CNC machine tools is mainly carried out in the modes of accidental maintenance and scheduled maintenance. In the mode of "accidental maintenance", maintenance is carried out only after equipment breaks down, which may cause a great loss in case of a sudden accident. In the mode of scheduled maintenance, maintenance is carried out when equipment is not operating and is in a static state, which has the following deficiencies: the difference between the condition of the equipment in non-operating state and that in operating state is obvious, which affects the accuracy of judgment; as inspection and maintenance are scheduled, even if the equipment is in good condition, test and maintenance still need to be carried out as planned, which results in a waste of manpower and material resources.

Currently, condition-based maintenance based on condition monitoring (usually on-line) and fault diagnosis is being developed. According to the measurement values obtained by condition monitoring and the information provided by operational processing results thereof, experts use the knowledge and experience of the equipment to make inferential judgment, find out the type, position and severity of an equipment fault, and then put forward maintenance and treatment suggestions for the equipment.

SUMMARY

The present invention distributes a wireless sensor network on a CNC machine tool, monitors operating parameters, collects data and provides a health degree model by learning according to historical data. The present invention can provide health degree of a current CNC machine tool in real time by on-line monitoring according to the health degree model and in combination with the current parameters, and can provide predictive maintenance alarm according to a set threshold, so as to realize on-line predictive maintenance of the CNC machine tool.

To solve the above technical problem, the present invention adopts the following technical solution:

A structure of a system of the present invention is shown in FIG. 1.

Parameters such as vibration and temperature are detected by Zigbee nodes and uploaded to a Zigbee gateway. The detected data is transmitted by the Zigbee gateway to a cloud server for digital signal processing, data mining and analysis processing. After a training test of the above data is carried out by the cloud server, a health degree model is obtained. The health degree model is transmitted by the cloud server to the Zigbee gateway. A clock circuit can be used for synchronizing system time and recording time as data is recorded. A keyboard and a display module are used as man-machine interfaces to input and display information.

The health degree of the CNC machine tool is predicted in real time by the Zigbee gateway according to the vibration and temperature data monitored by the sensor nodes (including a vibration sensor node and a temperature sensor node) and in combination with the model obtained by training. An administrator can log into the server remotely from a mobile phone or computer to check the health degree and other information. The system can also change the sampling frequency of the vibration node to record vibration data according to the health degree of the CNC machine tool.

A structure of the vibration sensor node is shown in FIG. 2.

The vibration sensor node of the present invention is composed of a DSP TMS320C6748 processor of Texas Instruments (TI), a CC2530 chip of TI, an A/D converter, a vibration sensor, an SD card storage module, a communication unit and a power supply module, and is mainly used for collecting and storing mechanical vibration signals and sending the collected data to the Zigbee gateway in a wireless transmission mode. When trained, the data is transmitted to the server for analysis and processing. Finally, FFT transformation processing is carried out by the server to obtain a spectrum average of a relevant frequency band. The spectrum average of the relevant frequency band is used as an important feature of the trained data to train the health degree model. The FFT transformation processing of the current vibration data can also be carried out by the TMS320C6748 processor of the vibration sensor node to obtain the spectrum average of the relevant frequency band, and then the spectrum average is transmitted to the Zigbee gateway for on-line prediction to give the health degree of the current CNC machine tool.

A method for diagnosing health of a CNC machine tool, comprising the following steps:

Step 1: using a cloud server to carry out FFT transformation processing on vibration data collected by a vibration sensor node, and obtaining spectrum averages of the following frequency bands: 800-1800 Hz, 1800-2800 Hz and 2800-3800 Hz.

Obtaining a regression coefficient of relationship among the spectrum average of a relevant frequency band, temperature and operating state of equipment according to corresponding historical data of the spectrum average of the frequency band and temperature.

1.1 Creating a data vector $$x=(x^{(1)},x^{(2)},x^{(3)},x^{(4)})$$

Wherein $x^{(1)}$ is the spectrum average of 800-1800 Hz, $x^{(2)}$ is the spectrum average of 1800-2800 Hz, $x^{(3)}$ is the spectrum average of 2800-3800 Hz, and $x^{(4)}$ is a temperature average of equipment;

1.2 Creating a coefficient vector $w=(w^{(1)}, w^{(2)}, w^{(3)}, w^{(4)})$, wherein $w^{(1)}$ is a coefficient of the spectrum average of 800-1800 Hz; $w^{(2)}$ is a coefficient of the spectrum average of 1800-2800 Hz; $w^{(3)}$ is a coefficient of the spectrum average of 2800-3800 Hz; and $w^{(4)}$ is a temperature coefficient;

1.3 $x_i$ is the $i^{th}$ trained data vector, and $y_i$ is a class marker of $x_i$. When $y_i$ is −1, it means that the equipment fails; when $y_i$ is +1, it means that the equipment is normal; and N is a quantity of trained data.

Finding a separating hyperplane with a maximum geometric margin, and a problem can be expressed as the following constrained optimization problem:

$$\min_{w,b,\xi} \frac{1}{2}\|W\|^2 + C\sum_{i=1}^{N}\xi_i$$

-continued $$S.t\ y_i(w.x_i + b) \geq 1 - \xi_i$$

$$\xi_i \geq 0 \quad i = 1, 2, \ldots N$$

C is a penalty coefficient, and $\xi_i$ is a slack variable;

It is assumed that C=0.35 here. As proved by repeated parameter adjustments, the effect is the best when C is this value.

Assuming that the solutions of the above problem are $w^*$ and $b^*$;

Transforming the original problem into a dual problem, and using KKT conditions to obtain an optimal solution of the dual problem, then:

$$w^* = \sum_{i=1}^{N} \alpha_i^* y_i x_i$$

$$b^* = -\frac{\max_{i=y_i=-1} w^* x_i + \min_{i=y_i=-1} w^* x_i}{2}$$

Wherein $\alpha^*$ is a solution of the dual problem in a Lagrange multiplier vector.

Step 2: 2.1 health degree of a CNC machine tool:

Health degree J of a CNC machine tool is a number between 0 and 1; the greater or the closer to 1 the value is, the more healthy the operating state is; the smaller or the closer to 0 the value is, the more unhealthy the operating state is and the greater the possibility of failure is.

The health degree J of the CNC machine tool can be calculated by the following steps:

$$Lc = \begin{cases} \frac{w^* x_0 + b^*}{|w^*|} & w^* x_c \geq w^* x_0 \\ \frac{w^* x_c + b^*}{|w^*|} & w^* x_c < w^* x_0 \end{cases};$$

$$L_0 = \frac{w^* x_0 + b^*}{0.95|w^*|};$$

$$J = \frac{Lc}{L_0}$$

Wherein $x_0$ is a data vector of a normally operating CNC machine tool calibrated by experts, and $x_c$ is a data vector of a current CNC machine tool obtained by on-line monitoring.

$L_0$ is an equivalent distance of the health degree of the calibrated CNC machine tool, and $L_c$ is an equivalent distance of the health degree of the current CNC machine tool.

2.2 Determination of predictive maintenance alarm threshold

A failure possibility index p means the possibility of failure.

$$p = \frac{2e^{-J}}{e^J + e^{-J}}$$

When p>r, alarm is given to prompt that the CNC machine tool needs maintenance, wherein r is a predictive maintenance alarm threshold.

The value of r is generally set to be 0.7-0.9. The effect is the best when the value is 0.8. A good trade-off is achieved between avoiding misrepresentation and avoiding omission.

The value of r can also be set independently by a user according to the situation of an enterprise.

Vibration signal AD conversion sampling frequency of the vibration sensor node is set to different values according to the change of the health degree. This mode enables a system to obtain more frequency domain data information when the health degree is low, so as to facilitate monitoring and analysis.

$$f_c = \frac{f_0}{N};$$

$$N = \begin{cases} N_0 & J \geq 0.5 \\ 2N_0 & J < 0.5 \end{cases};$$

Wherein $f_c$: vibration signal AD conversion sampling frequency;

$f_0$: crystal oscillator frequency;

N: frequency dividing ratio of variable frequency divider; and $N_0$: reference value of frequency dividing ratio.

The present invention has the following beneficial effects:

The present invention can provide and display health degree information in real time by on-line monitoring of the CNC machine tool according to a fault model and in combination with the current parameters. For the on-line predictive maintenance of the CNC machine tool, the most rapid and accurate predictive maintenance information is provided. Predictive maintenance alarm threshold is selected properly, and a good trade-off is achieved between avoiding misrepresentation and avoiding omission. Vibration signal sampling frequency can be changed according to the health degree, which enables a system to obtain more frequency domain data information when the health degree is low, so as to facilitate monitoring and analysis.

DETAILED DESCRIPTION

Figure 1:
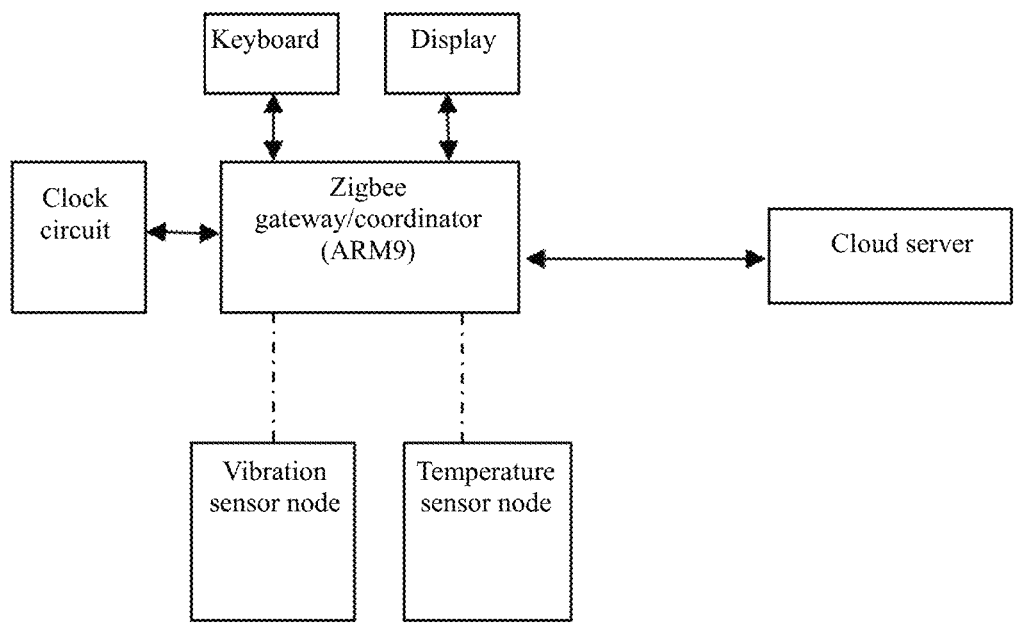
FIG. 1 is a structural schematic diagram of a system of the present invention.
Figure 2:
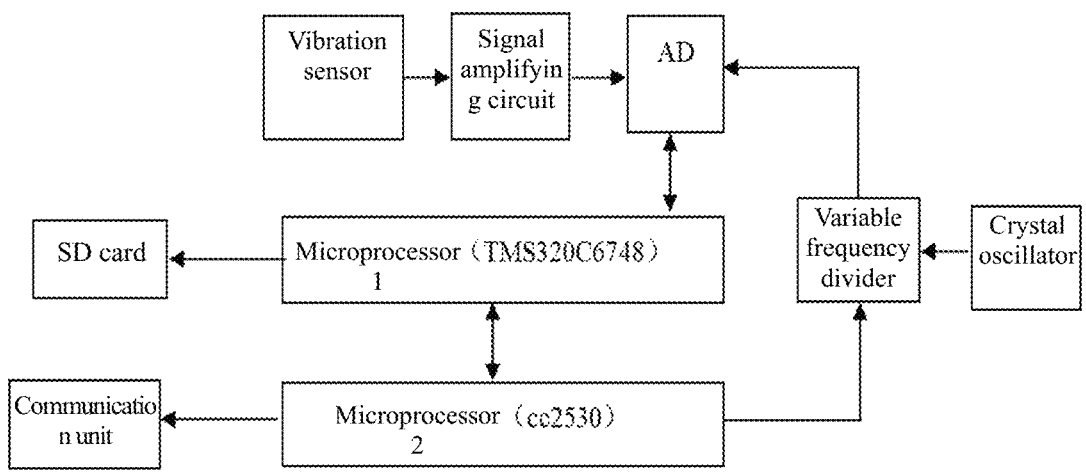
FIG. 2 is a circuit structural schematic diagram of a vibration sensor node of the present invention.

To make the summary of the present invention easier to understand clearly, the present invention is further described below in details according to specific embodiments and in combination with drawings.

A method for diagnosing health of a CNC machine tool, comprising the following steps:

Step 1: using a cloud server to carry out FFT transformation processing on vibration data collected by a vibration sensor node, and obtaining spectrum averages of 800-1800 Hz, 1800-2800 Hz and 2800-3800 Hz;

Vibration signal AD conversion sampling frequency $f_c$ of the vibration sensor node is set to different values according to the change of the health degree:

$$f_c = \frac{f_0}{N};$$

$$N = \begin{cases} N_0 & J \geq 0.5 \\ 2N_0 & J < 0.5 \end{cases};$$

Wherein $f_c$: vibration signal AD conversion sampling frequency;

$f_0$: crystal oscillator frequency;

N: frequency dividing ratio of variable frequency divider; and $N_0$: reference value of frequency dividing ratio.

Obtaining a regression coefficient of relationship among the spectrum average of a relevant frequency band, temperature and operating state of equipment according to corresponding historical data of the spectrum average of the frequency band and temperature;

1.1 Creating a data vector $$x=(x^{(1)},x^{(2)},x^{(3)},x^{(4)})$$

Wherein $x^{(1)}$ is the spectrum average of 800-1800 Hz, $x^{(2)}$ is the spectrum average of 1800-2800 Hz, $x^{(3)}$ is the spectrum average of 2800-3800 Hz, and $x^{(4)}$ is a temperature average of equipment;

1.2 Creating a coefficient vector $w=(w^{(1)}, w^{(2)}, w^{(3)}, w^{(4)})$, wherein $w^{(1)}$ is a coefficient of the spectrum average of 800-1800 Hz; $w^{(2)}$ is a coefficient of the spectrum average of 1800-2800 Hz; $w^{(3)}$ is a coefficient of the spectrum average of 2800-3800 Hz; and $w^{(4)}$ is a temperature coefficient;

1.3 $x_i$ is the $i^{th}$ trained data vector, and $y_i$ is a class marker of $x_i$; When $y_i$ is −1, it means that the equipment fails; when $y_i$ is +1, it means that the equipment is normal; and N is a quantity of trained data;

Finding a separating hyperplane with a maximum geometric margin, and a problem is expressed as the following constrained optimization problem:

$$\min_{w,b,\xi} \frac{1}{2}\|W\|^2 + C\sum_{i=1}^{N}\xi_i$$

$$\text{S.t } y_i(w \cdot x_i + b) \geq 1 - \xi_i$$

$$\xi_i \geq 0 \quad i=1,2,\ldots N$$

C is a penalty coefficient, C=0.35, and $\xi_i$ is a slack variable;

Assuming that the solutions of the constrained optimization problem are $\mathcal{W}^*$ and $b^*$;

Transforming the original problem into a dual problem, and using KKT conditions to obtain an optimal solution of the dual problem, then:

$$w^* = \sum_{i=1}^{N} \alpha_i^* y_i x_i$$

$$b^* = -\frac{\max_{i=y_i=-1} w^* x_i + \min_{i=y_i=-1} w^* x_i}{2}$$

Wherein $\alpha^*$ is a solution of the dual problem in a Lagrange multiplier vector;

Step 2:

2.1 Health degree of a CNC machine tool:

Health degree J of a CNC machine tool is a number between 0 and 1; the greater or the closer to 1 the value is, the more healthy the operating state is; the smaller or the closer to 0 the value is, the more unhealthy the operating state is and the greater the possibility of failure is;

The health degree J of the CNC machine tool can be calculated by the following steps:

$$Lc = \begin{cases} \frac{w^* x_0 + b^*}{|w^*|} & w^* x_c \geq w^* x_0 \\ \frac{w^* x_c + b^*}{|w^*|} & w^* x_c < w^* x_0 \end{cases};$$

$$L_0 = \frac{w^* x_0 + b^*}{0.95|w^*|};$$

$$J = \frac{Lc}{L_0}$$

Wherein $x_0$ is a data vector of a normally operating CNC machine tool calibrated by experts, and $x_c$ is a data vector of a current CNC machine tool obtained by on-line monitoring;

$L_0$ is an equivalent distance of the health degree of the calibrated CNC machine tool, and $L_c$ is an equivalent distance of the health degree of the current CNC machine tool;

2.2 Determination of predictive maintenance alarm threshold

A failure possibility index p means the possibility of failure;

$$p = \frac{2e^{-J}}{e^J + e^{-J}}$$

When p>r, alarm is given to prompt that the CNC machine tool needs maintenance, wherein r is a predictive maintenance alarm threshold. The value of the predictive maintenance alarm threshold r is set to be 0.7-0.9.

The invention claimed is:

1. A method for diagnosing health of a Computerized Numerical Control (CNC) machine tool, comprising the following steps:

step 1: using a cloud server to carry out Fast Fourier Transformation (FFT) processing on vibration data collected by a vibration sensor node, and obtaining spectrum averages of 800-1800 Hz, 1800-2800 Hz and 2800-3800 Hz;

obtaining a regression coefficient of relationship among the spectrum average of a relevant frequency band, temperature and operating state of equipment according to corresponding historical data of the spectrum average of the frequency band and temperature;

1.1 creating a data vector $$x=(x^{(1)},x^{(2)},x^{(3)},x^{(4)})$$

wherein $x^{(1)}$ is the spectrum average of 800-1800 Hz, $x^{(2)}$ is the spectrum average of 1800-2800 Hz, $x^{(3)}$ is the spectrum average of 2800-3800 Hz, and $x^{(4)}$ is a temperature average of equipment;

1.2 creating a coefficient vector $w=(w^{(1)}, w^{(2)}, w^{(3)}, w^{(4)})$, wherein $w^{(1)}$ is a coefficient of the spectrum average of 800-1800 Hz; $w^{(2)}$ is a coefficient of the spectrum average of 1800-2800 Hz; $w^{(3)}$ is a coefficient of the spectrum average of 2800-3800 Hz; and $w^{(4)}$ is a temperature coefficient;

1.3 $x_i$ is the $i^{th}$ trained data vector, and $y_i$ is a class marker of $x_i$; when $y_i$ is −1, it means that the equipment fails; when $y_i$ is +1, it means that the equipment is normal; and N is a quantity of trained data;

finding a separating hyperplane with a maximum geometric margin, and a problem is expressed as the following constrained optimization problem:

$$\min_{w,b,\xi} \frac{1}{2}\|W\|^2 + C\sum_{i=1}^{N}\xi_i$$

$$\text{S.t } y_i(w.x_i + b) \geq 1 - \xi_i$$

$$\xi_i \geq 0 \quad i = 1, 2, \ldots N$$

C is a penalty coefficient, and is a slack variable;
assuming that the solutions of the constrained optimization problem are $\mathcal{W}^*$ and $b^*$, transforming the original problem into a dual problem, and using Karush-Kuhn-Tucker (KKT) conditions to obtain an optimal solution of the dual problem, then:

$$w^* = \sum_{i=1}^{N} \alpha_i^* y_i x_i$$

$$b^* = -\frac{\max_{i=y_i=-1} w^* x_i + \min_{i=y_i=-1} w^* x_i}{2}$$

wherein $\alpha^*$ is a solution of the dual problem in a Lagrange multiplier vector;
step 2:
2.1 health degree of a CNC machine tool: health degree J of a CNC machine tool is a number between 0 and 1; the greater or the closer to 1 the value is, the more healthy the operating state is; the smaller or the closer to 0 the value is, the more unhealthy the operating state is and the greater the possibility of failure is; the health degree J of the CNC machine tool can be calculated by the following steps:

$$Lc = \begin{cases} \frac{w^* x_0 + b^*}{|w^*|} & w^* x_c \geq w^* x_0 \\ \frac{w^* x_c + b^*}{|w^*|} & w^* x_c < w^* x_0 \end{cases};$$

$$L_0 = \frac{w^* x_0 + b^*}{0.95|w^*|};$$

$$J = \frac{Lc}{L_0}$$

wherein $x_0$ is a data vector of a normally operating CNC machine tool calibrated by experts, and $x_c$, is a data vector of a current CNC machine tool obtained by on-line monitoring;
$L_o$ is an equivalent distance of the health degree of the calibrated CNC machine tool, and $L_C$ is an equivalent distance of the health degree of the current CNC machine tool;
2.2 determination of predictive maintenance alarm threshold
a failure possibility index p means the possibility of failure;

$$p = \frac{2e^{-J}}{e^J + e^{-J}}$$

when p>r, alarm is given to prompt that the CNC machine tool needs maintenance, wherein r is a predictive maintenance alarm threshold.

2. The method for diagnosing health of a CNC machine tool of claim 1, wherein in step 1, vibration signal AD conversion sampling frequency $f_c$ of the vibration sensor node is set to different values according to the change of the health degree:

$$f_c = \frac{f_0}{N};$$

$$N = \begin{cases} N_0 & J \geq 0.5 \\ 2N_0 & J < 0.5 \end{cases};$$

wherein $f_c$ vibration signal AD conversion sampling frequency;
$f_0$: crystal oscillator frequency;
N: frequency dividing ratio of variable frequency divider; and
$N_0$: reference value of frequency dividing ratio.

3. The method for diagnosing health of a CNC machine tool of claim 1, wherein the value of the predictive maintenance alarm threshold r is set to be 0.7-0.9.

4. The method for diagnosing health of a CNC machine tool of claim 1, wherein in step 1.3, the penalty coefficient C=0.35.

5. The method for diagnosing health of a CNC machine tool of claim 3, wherein in step 1.3, the penalty coefficient C=0.35.

6. A system adopted in the method for diagnosing health of a CNC machine tool of claim 1, comprising a Zigbee gateway, a cloud server and sensor nodes; detected data is transmitted by the Zigbee gateway to the cloud server for digital signal processing, data mining and analysis processing; after a training test of the above data is carried out by the cloud server, a health degree model is obtained; the health degree model is transmitted by the cloud server to the Zigbee gateway; a clock circuit can be used for synchronizing system time and recording time as data is recorded; and the health degree of the CNC machine tool is predicted in real time by the Zigbee gateway according to the vibration and temperature data monitored by the sensor nodes and in combination with the model obtained by training.

7. The system of claim 6, wherein the sensor nodes include a vibration sensor node; the vibration sensor node is composed of a DSP TMS320C6748 processor of Texas Instruments (TI), a CC2530 chip of TI, an A/D converter, a vibration sensor, an SD card storage module, a communication unit and a power supply module, and is used for collecting and storing mechanical vibration signals and sending the collected data to the Zigbee gateway in a wireless transmission mode.

* * * * *